(12) United States Patent
Batchelor et al.

(10) Patent No.: US 6,490,647 B1
(45) Date of Patent: Dec. 3, 2002

(54) FLUSHING STALE DATA FROM A PCI BUS SYSTEM READ PREFETCH BUFFER

(75) Inventors: Gary William Batchelor, Tucson, AZ (US); Michael Thomas Benhase, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,917

(22) Filed: Apr. 4, 2000

(51) Int. Cl.[7] ................................................ G06F 13/36
(52) U.S. Cl. ...................... 710/310; 710/305; 710/306; 712/226
(58) Field of Search ................................. 710/100, 305, 710/306, 310; 712/226, 227

(56) References Cited

U.S. PATENT DOCUMENTS

| | | | |
|---|---|---|---|
| 4,763,253 A | 8/1988 | Bluhm et al. ............... 364/200 |
| 5,404,471 A | 4/1995 | Kawano et al. ............. 395/375 |
| 5,761,464 A | * 6/1998 | Hopkins ..................... 710/310 |
| 5,805,879 A | 9/1998 | Hervin et al. ............... 395/591 |
| 5,815,677 A | 9/1998 | Goodrum ..................... 395/306 |
| 5,987,598 A | * 11/1999 | Levine et al. ................ 712/227 |

* cited by examiner

Primary Examiner—Peter Wong
Assistant Examiner—Chirstopher E. Lee
(74) Attorney, Agent, or Firm—John H. Holcombe

(57) ABSTRACT

A system and method for flushing stale data from a read prefetch buffer of a PCI bus system which transfers data in the form of data streams of contiguous blocks. The PCI bus system comprises a channel adapter at one PCI bus that issues read commands, a data source coupled to a second PCI bus, and a prefetch buffer that prefetches the blocks of read data. A prefetch counter posts the remaining number blocks to be read and transferred, posting the prefetch count at a storage location of a storage memory mapped to a prefetch location in the prefetch buffer. The prefetch count is written to the storage location by a prefetch count write command. The system for flushing stale data from the prefetch buffer comprises a key detector for sensing an unique identifier of the prefetch count write command. Data path logic responds to the key detector, determining the prefetch location of the prefetch buffer from the mapped storage location of the prefetch count write command, and flushing any prefetch data at the determined prefetch location.

12 Claims, 4 Drawing Sheets

PREFETCH COUNT

WRITE COMMAND

FLUSHING STALE DATA FROM A PCI BUS SYSTEM READ PREFETCH BUFFER

Commonly assigned U.S. patent application Ser. No. 09/275,610 is incorporated for its showing of a PCI bus bridge system for processing requests from multiple attached agents.

FIELD OF THE INVENTION

This invention relates to read prefetch buffers in PCI bus systems, which contain blocks of prefetched data to be read, and, more particularly, to flushing unread stale data from the PCI bus system prefetch buffer to prevent the reading of the stale data.

BACKGROUND OF THE INVENTION

The Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '610 application describes an example of a complex PCI bus system for providing a connection path between a secondary PCI bus, to which are attached a plurality of hosts or host channel adapters, and at least one primary PCI bus, to which are attached a plurality of peripheral devices, and allows the prefetching of data for read transactions of multiple channel adapters in parallel. The incorporated '610 application additionally defines many of the terms employed herein, and such definitions are also available from publications provided by the PCI Special Interest Group, and will not be repeated here.

Major computer systems may employ PCI bus systems to provide fast data storage from hosts, such as network servers, via channel adapters and the PCI bus system, to attached data storage servers having storage devices, cache storage, or non-volatile cache storage.

A channel adapter (an adapter coupling a host system to a secondary PCI bus) attempts to read large amounts of data at once from a data storage or memory device (a non-volatile store or a data storage device adapter or controller processor coupled to a primary PCI bus), such as transactions of a contiguous string of a number of blocks of data. The PCI bus architecture does not define the total amount of data to be accessed in an operation, and does require that read operations be broken up to allow access by other agents on the bus. This is because read operations require time for the command to pass through the bus system, time to access the data at the source of the data, and time for passage of the data back through the bus system. To allow a read operation to monopolize the bus for a sequence of reads to complete access to the total amount of the data at one time would be very inefficient and would substantially reduce the effective bandwidth of the PCI bus system.

Hence, the PCI bus architecture, e.g., of the incorporated '610 application, limits access to the PCI bus. Typically, the read operation requires a delay before the data is accessed from the source device and supplied to the prefetch buffer. Additionally, not all of the data may be accessed in a single transaction, and only a portion of the data is loaded into the prefetch buffer, leading to a delay. Hence, the requesting agent is disconnected after the delay exceeds a predetermined time, and another agent allowed access, even though part of the data is loaded in the prefetch buffer.

As discussed in the incorporated '610 application, a problem was that, while an original agent was disconnected to allow access by another agent, a read operation by the other agent would be for data having a different address, and the PCI bus system would flush any as yet unread prefetched original data as having an incorrect address, so as to make room for the desired data of the other agent. Thus, in the incorporated '610 application, read transactions of multiple hosts (via channel adapters) are allowed to be processed in parallel by allowing prefetched data blocks for different requesting agents to be stored in different parallel FIFO buffers without being flushed. The prefetched data remains buffered for later retry of a read request by the original requesting agent even if another agent issues an intervening read request. After being disconnected, the original agent then retries the read access at its allocated parallel buffer, and will be granted access after all the other requesting agents coupled to the secondary bus have been granted access. The prefetch buffer allocated to the original agent will retain the data that had been incompletely loaded and will continue to be loaded as the data is accessed. Upon the grant of one of the retries by the original agent, and completion of building the block of data, the block is transferred to the requesting agent.

As discussed above, the PCI bus architecture does not define the total amount of data to be accessed in an operation, and does require that read operations be broken up to allow access by other agents on the bus. Thus, the number of blocks remaining of the complete transaction to be prefetched and read must be continuously tracked. In order to track the blocks of data that are accessed to build the full amount of requested data, a prefetch count is established by a prefetch counter and stored in a storage memory. The prefetch counter decrements a remainder count as blocks of data are accessed, updating the remainder count stored in the storage memory. As one example, the count comprises the number of 512K byte blocks remaining to be read for the complete transaction, and is decremented by one as each 512 byte block is read. Upon completion of the complete read transaction, the remainder count is "zero", and the FIFO is empty.

However, the requesting host is often working with and updating the data as it is being read. Further, in PCI bus systems, writes are processed much more quickly than reads, in view of the wait time for reads. Thus, a first prefetch may have loaded prefetch data into the FIFO that has been updated in a parallel write operation by the requesting agent before it (the now stale data) has been read from the FIFO. It is thus possible that the requesting agent will issue a new read request for the updated data using the same beginning address as the stale prefetched data in the FIFO. Thinking that the prefetched data is the updated data, the requesting agent will read the stale data instead.

Further, the desired data may not end on the same boundary as the prefetched data, and the agent will only read the desired data, leaving the unread prefetched data still in the prefetch buffer. The requesting agents typically process data in contiguous sequence, and the original agent may subsequently request data starting at the address of the data remaining in the prefetch buffer. This data will also be stale and may have been updated by another host or by the same host via another channel adapter.

One approach for flushing stale data from a prefetch buffer was to do an extra read before doing an actual read. The extra read would have to be at an unrelated address to throw out any stale data that may have the desired address. However, as discussed above, read operations are notoriously slow, and, as the result, the actual read is slowed by an extra operation that is a read operation, hurting the performance of the PCI bus system.

SUMMARY OF THE INVENTION

An object of the present invention is to flush unread stale data from a PCI bus system prefetch buffer efficiently, avoiding performance degradation resulting from extra reads.

A system and method are disclosed for flushing stale data from a read prefetch buffer of a PCI bus system which transfers data in the form of data streams comprising a plurality of contiguous blocks. The PCI bus system comprises a plurality of PCI busses, at least one PCI data destination (such as a channel adapter) coupled to a first of the plurality of PCI busses, and at least one PCI data source (such as a data storage device) coupled to a second of the plurality of PCI busses. A prefetch buffer stores the blocks of data read from the PCI data source at a prefetch location, the blocks associated as one of the data streams in response to a read command. The prefetch buffer location may comprise one of a plurality of parallel buffers that was assigned at initialization to the requesting data destination (channel adapter). A prefetch counter posts the number blocks of the data stream to be read in response to the read command and transferred from the PCI data source to the PCI data destination, the prefetch counter posting the prefetch count at a storage location of a storage memory, the storage location of the storage memory mapped, also at initialization, to the prefetch location in the prefetch buffer.

The system for flushing stale data from the prefetch buffer comprises a transaction control key detector coupled to one of the PCI busses for sensing an unique identifier of a prefetch count write command. The transaction control loads the desired prefetch count in an addressed storage location in the storage memory. The key detector identifies the prefetch count write command by the unique identifier, and data path logic coupled to the key detector responds to the sensed unique identifier of the prefetch count write command, determining the prefetch location of the prefetch buffer as mapped from the addressed storage location of the prefetch count write command, and flushing any prefetch data at the determined prefetch location of the prefetch buffer.

In one embodiment, the prefetch count write command unique identifier comprises at least one bit of a PCI address of the prefetch count write command. The bit is outside the decode range of addresses employed for addressing the target storage memory in the PCI address, and the key detector senses the bit of the PCI address to identify the prefetch count write command.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
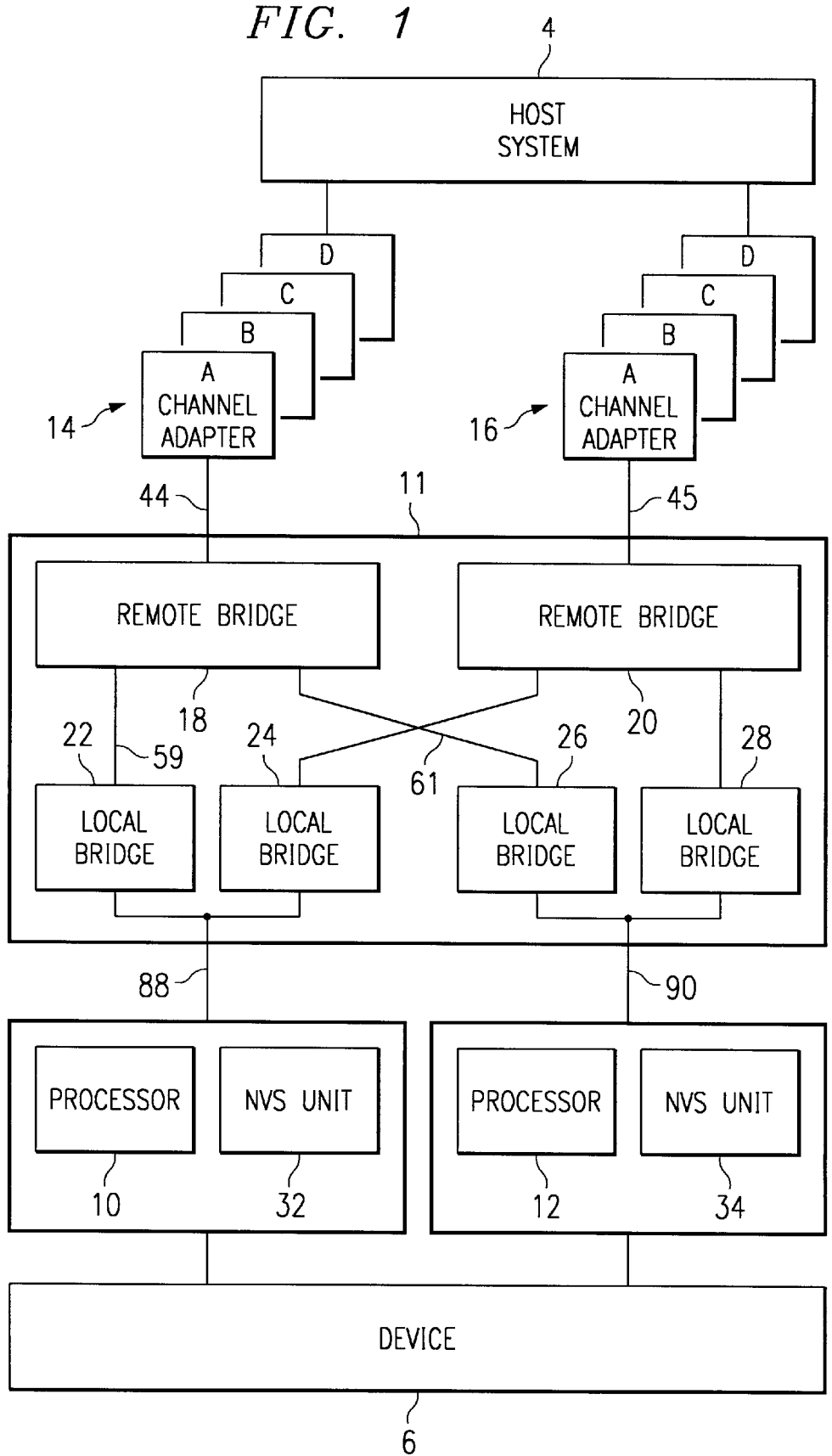
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as processors 10, 12, a device 6, and NVS (non-volatile store) units 32, 34. The exemplary PCI bus system 11 is based upon that illustrated in the incorporated '610 application, employing similar components, modified in accordance with the present invention. As discussed in the incorporated '610 application, the device 6 may comprise a direct access storage device subsystem, such as a string of DASDs.

The PCI bus system 11 allows the host systems 4 to communicate with the processor 10, 12, employing adapters 14A, B, C and D, 16A, B, C and D or other communication agents (not shown), including any device that typically communicates over a PCI bus. The channel adapters 14, 16 may comprise channel adapter cards that are each connected via a slot on the PCI bus system to a remote bridge 18, 20 of the PCI bus system 11. Each channel adapter card provides a connection to one or more host systems 4 at a secondary PCI bus 44, 45. Briefly, processor 10 controls a primary PCI bus 88, and processor 12 controls a primary PCI bus 90, each providing addresses for access by the adapters 14, 16 at secondary PCI busses 44, 45.

Two remote bridges 18, 20 may be provided coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example, the local bridges 22, 24 may communicate with processor 10 and NVS unit 32 on primary PCI bus 88, and the local bridges 26, 28 may communicate with processor 12 and NVS unit 34 on primary PCI bus 90, although other arrangements may be envisioned by those of skill in the art. Thus, in the present example of a PCI bus system, the adapters 14A–D coupled to remote bridge 18 may communicate with the processors 10, 12 or NVS unit 32, 34 over the PCI bus system 11.

An important communication in a PCI bus system is the reading of stored data by a host system 4 at the NVS units 32, 34 and at a device 6, the data stored in the selected unit or device under the control of the processor 10, 12. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. As the result, the PCI bus systems become increasingly complex.

The data to be stored is typically customer data which will be retrieved at a subsequent time. The data may be retrieved, processed, and the updated data stored. It is of the utmost importance to the customer that the retrieved data is the most current. Thus, in addition to fast data storage and retrieval, there must be some assurance that the customer data is current and not stale.

In PCI bus systems, the channel adapters 14, 16 attempt to read large amounts of data in a single operation, such as reading a contiguous string of a number of blocks of data. As discussed above, read operations are notoriously slow, so the PCI architecture requires that the read operations be broken up to allow access by other agents on the bus system.

Figure 2:
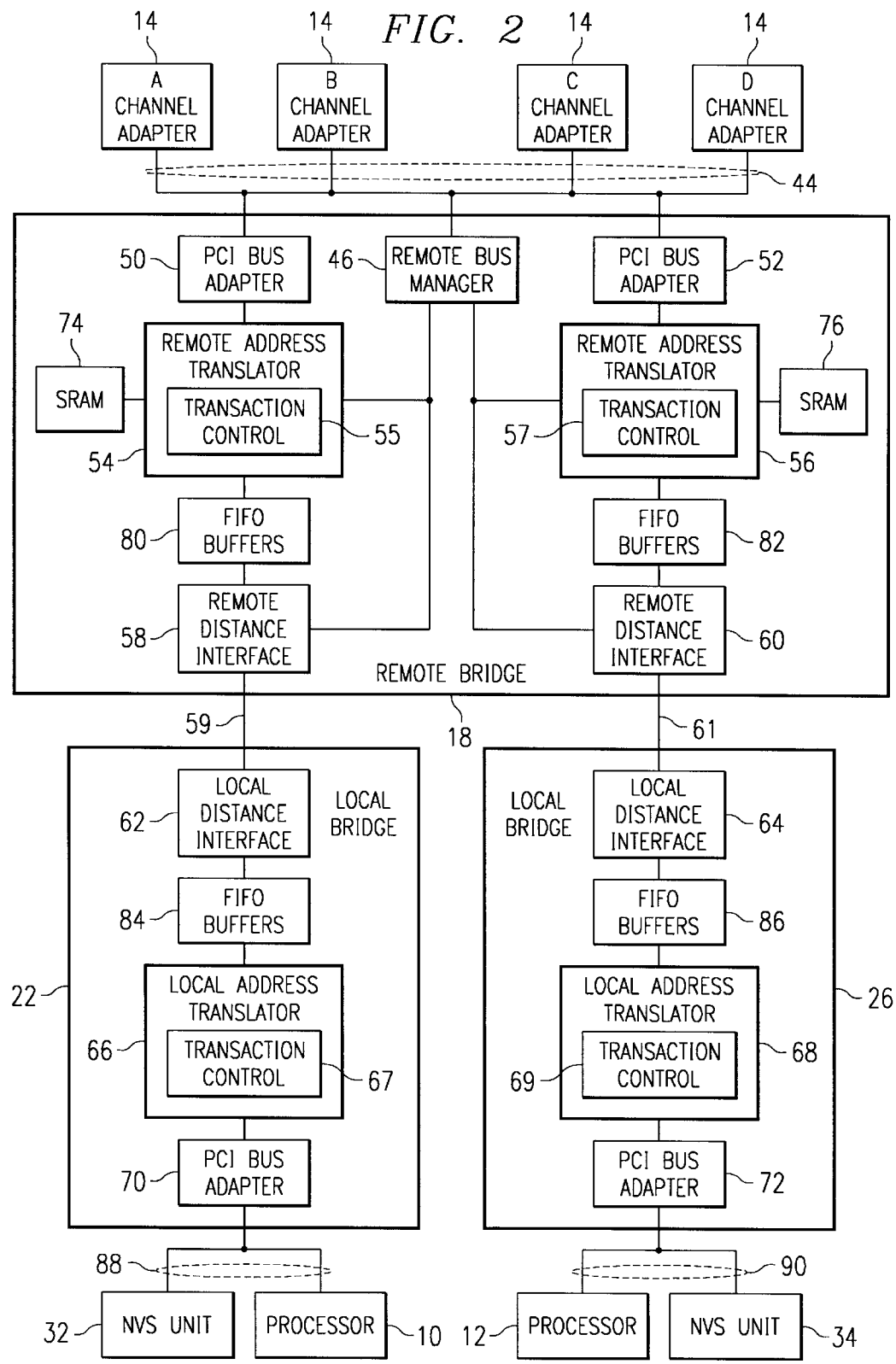
FIG. 2 is a block diagram of the PCI bus system of FIG. 1, illustrating a PCI remote bridge and two PCI local bridges.

Referring additionally to FIG. 2, further detail of one-half of the exemplary complex PCI bridge system of FIG. 1 is illustrated. As discussed in the incorporated '610 application, complex PCI systems employ prefetch capability for reading data and employ arbitration between commands from the attached channel adapters on the secondary PCI bus to manage the usage of the bus system in an efficient manner. In the example of FIG. 2, the prefetch and arbitration are directed by a bus manager 46. For arbitration, the PCI bus manager 46 grants the commands from the channel adapters 14A–D on secondary PCI bus 44 in a round-robin fashion. An element of PCI bus architecture is that, because PCI read commands are extremely slow operations to complete, especially in complex PCI bus systems with multiple hosts and with multiple PCI bridges between the channel adapters and the storage devices, the requesting adapter is therefore disconnected from the bus if there is any delay in the read operation, so as to allow other uses of the bus by other requesters.

The exemplary PCI bus system of FIG. 2 includes the PCI bus manager 46 which manages data and signals presented on the secondary PCI bus 44. The PCI bus manager 46 comprises bus central resource functions, which include circuitry that manages the bus arbitration discussed above, bus parking, and other bus management functions, preferably with standalone circuitry. The bus manager 46 has information describing the address ranges of the agents attached to the remote bridge 18, the PCI bus adapters 50 and 52, and other elements of the remote bridge, and uses this information to determine which agent or element is targeted by a PCI operation. The information on the address ranges was provided at initialization and is preferably written to registers in the bus manager 46, and may be copied to the PCI bus adapters. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14 and local bridge 22. The PCI bus adapter 52, remote address translator 56, transaction control 57, and remote distance interface 60 provide communication between channel adapters 14 and local bridge 26. The channel adapters 14A, B, C, D communicate with either PCI bus adapter 50 or 52 via the secondary PCI bus 44. The PCI bus adapters 50, 52, remote address translators 54, 56, transaction control 55, 57, remote distance interfaces 58, 60 and SRAMs 74, 76 may comprise logical elements of PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. The remote bridge 20 may be the same or similar to the remote bridge 18, and provides communication with the local bridges 24, 28.

Each local bridge 22, 26 comprises, respectively, a local distance interface 62, 64, a local address translator 66, 68, a transaction control 67, 69, and a PCI bus adapter 70, 72. The remote 54, 56 and local 66, 68 address translators include circuitry known in the art to map a received address to another address space. Remote address translators 54, 56 perform address translation operations by mapping an address provided by channel adapters 14 to the address space of the local PCI bus adapters 70, 72, respectively. Local address translators 66, 68 map an address from the local PCI bus adapters 70, 72 to the remote PCI bus adapter 50, 52 address space, such that this translated address is transmitted to the remote address translator 54, 56 via the local 62, 64 and remote 58, 60 distance interfaces. In such case, the remote address translator 54, 56 may buffer and transmit this received address to the remote PCI bus adapters 50, 52. Similarly, after remote address translator 54, 56 translates an address received from the remote PCI bus adapter 50, 52 to the address space of the local PCI bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local PCI bus adapter 70, 72.

The PCI busses 44, 88 and 90 are designed for only very short distances, measured substantially in inches, and small loads, and the distance connections 59, 61 are designed for longer distances with greater loads.

As discussed above, to prevent a read operation from monopolizing the bus for access to the total amount of the data at one time would be very inefficient and would substantially reduce the effective bandwidth of the PCI bus system.

Hence, the PCI bus architecture, e.g., of the incorporated '610 application, limits access to the PCI bus. As discussed above, typically, the read operation requires a delay before the data is accessed from the source device and supplied to the prefetch buffer. Additionally, not all of the data may be accessed in a single transaction, and only a portion of the data is loaded into the prefetch buffer, leading to a delay. Hence, the requesting agent is disconnected after the delay exceeds a predetermined time, and another agent allowed access, even though part of the data is loaded in the prefetch buffer.

Figure 3:
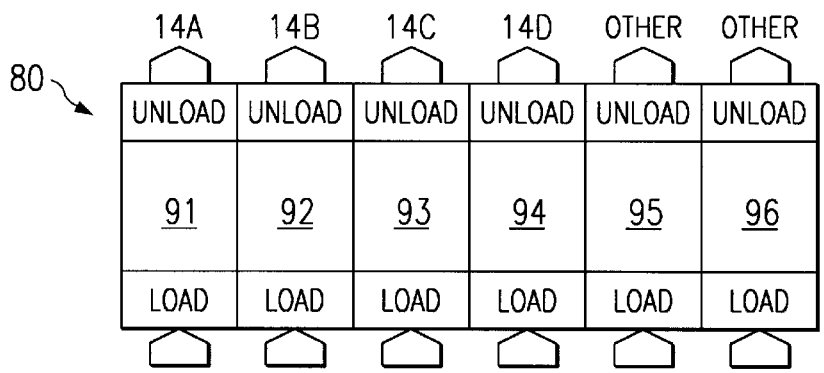
FIG. 3 is a diagrammatic representation of FIFO buffers of FIG. 2.

Referring additionally to FIG. 3, to prevent flushing of unread data from the prefetch buffer while an original agent is disconnected to allow access by another agent, read transactions of multiple hosts (via channel adapters) are allowed to be processed in parallel by allowing prefetched data blocks for different requesting agents to be stored in different prefetch locations which comprise different parallel FIFO buffers. Thus, in the incorporated '610 application, each channel adapter 14A–D attached to the remote bridge 18 has a parallel FIFO buffer comprising a section or location of a FIFO buffer 80, 82. Each prefetch location of the FIFO buffers, e.g., the section of FIFO buffer 80, is assigned to a specific agent on the PCI bus system at initialization. The prefetched data remains buffered for later retry of a read request by the original requesting agent even if another agent issues an intervening read request. After being disconnected, the original agent then retries the read access at its assigned prefetch buffer, and will be granted access after all the other requesting agents coupled to the secondary bus have been granted access. The prefetch buffer assigned to the original agent will retain the data that had been incompletely loaded and will continue to be loaded as the data is accessed. Upon the grant of one of the retries by the original agent, and completion of the block of data, the block is transferred to the requesting agent.

Specifically, the sections of FIFO buffers 80, 82, of the remote bridge 18 and the sections of FIFO buffers 84 and 86 of the local bridges 22, 26 queue the read/write transactions in the PCI bus system 11. Each of the sections of FIFO buffers queue the transaction from the channel adapters 14A, B, C, D and the processors 10, 12. The address translators 54, 56, 66, and 68 include transaction control circuitry 55, 57, 67, and 69 that includes logic to select sections of the FIFO buffers 80, 82, 84, and 86 to place a transaction and manage the flow of transactions. In FIG. 3, the sections of FIFO buffers 80 may comprise buffers 91–96, each having the appropriate load/unload circuitry, and be assigned, respectively, to the channel adapters 14A, B, C, D and other agents coupled to the secondary PCI bus 44, such as PCI bus adapters 50, 52, or for read operations. As discussed in the incorporated '610 application, other sections of the FIFO buffers may be employed for write operations and for control.

Figure 4:
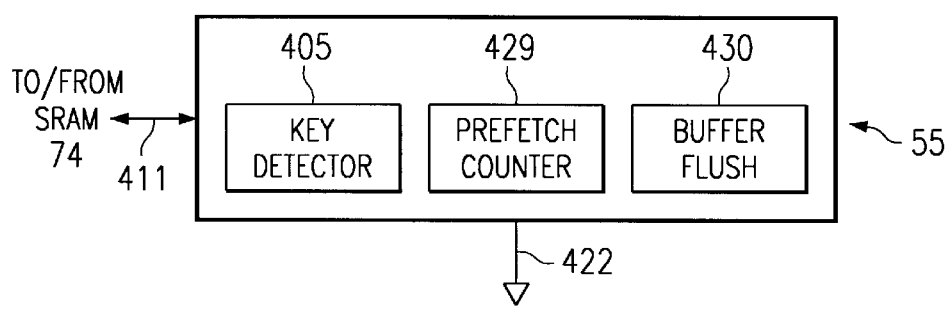
FIG. 4 is a block diagram of an embodiment of a transaction control of FIG. 2 arranged in accordance with the present invention.

The transaction control 55, 57 of FIG. 2, illustrated in greater detail in FIG. 4, comprises a prefetch counter 429 for the associated FIFO buffers, and determines the remaining number blocks of the data stream to be read in response to a read command and transferred from the PCI data source to the PCI data destination. The prefetch counter posts the prefetch count at a storage location of a storage memory, e.g., in a space in the SRAM 74, 76. The location of the space of the SRAM is mapped to the FIFO buffer of the prefetch location, or section, of FIFO buffers 80, 82 assigned to the requester for read operations, as is understood by those of skill in the art.

Figure 5:
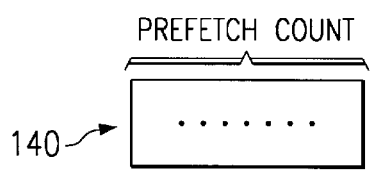
FIG. 5 is a bit chart representation of a PCI bus prefetch count.

Referring additionally to FIG. 5, a prefetch count may comprise a total count of the number of blocks remaining to be transferred, such as the total number of 512 byte blocks. Thus, upon receipt of a read command, the requester determines the total length of the read request and writes the number of blocks to be accessed by the requester in the mapped prefetch count storage location 140. If a total length is 64K bytes, the number of 512 byte blocks is 128. Thus, as each block of the data is transferred, the prefetch remainder count 140 is decremented by 1 block. Upon completion of the complete read transaction, the remainder count is "zero", and the FIFO is empty.

As an alternative, a block of data may comprise a single byte of data, or may comprise a word of data having a plurality of bytes.

As discussed above, the requesting host is often working with and updating the data as it is being read. Further, in PCI bus systems, writes are processed much more quickly than reads, in view of the wait time for reads. Thus, a first prefetch may have loaded prefetch data into the FIFO that has been updated in a parallel write operation by the requesting agent before it (the now stale data) has been read from the FIFO. It is thus possible that the requesting agent will issue a new read request for the updated data using the same beginning address as the stale prefetched data in the FIFO. Based on an assumption that the prefetched data is the updated data, the requesting agent will read the stale data instead.

Also, the desired data may not end on the same boundary as the prefetched data, and the agent will only read the desired data, leaving the unread data still in the prefetch buffer. The requesting hosts typically process data in contiguous sequence, and the original agent may subsequently request data starting at the address of the data remaining in the prefetch buffer. This data will also be stale and may have been updated at the data source by another host or by the same host via another channel adapter.

An approach for flushing stale data from a prefetch buffer has been to do an extra read before doing an actual read. The extra read would have to be at an unrelated address to throw out any stale data that may have the desired address. As the result, the actual read is slowed by an interposed operation that is a slow read operation, hurting the performance of the PCI bus system.

In accordance with the present invention, the prefetch count write command, which is required by the prior art to load the prefetch count, is additionally provided with an unique identifier. The unique identifier is sensed by the transaction control 55, 57 associated with the FIFO buffer 80, 82. The prefetch count write command refers to a storage location 140 of the storage memory, such as SRAM 74, 76, which is mapped to the agent requesting the read operation.

Figure 6:
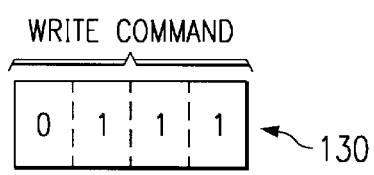
FIG. 6 is a bit chart representation of a PCI bus "write" command.
Figure 7:
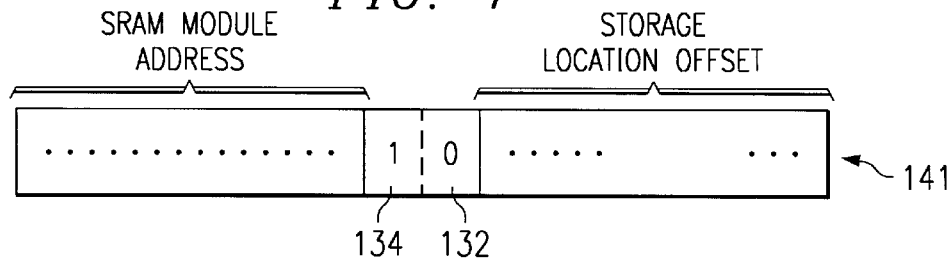
FIG. 7 is a bit chart representation of an embodiment of a PCI bus address identifying a prefetch count write command in accordance with an embodiment of the present invention.

Referring additionally to FIG. 6, the bit pattern of a write command 130 is illustrated. The data accompanying the prefetch count write command comprises the prefetch count for the read operation, and is illustrated by the bit pattern 140 of FIG. 5, comprising the number of blocks for the complete read operation. The prefetch count write command is addressed to the storage location of the SRAM by means of an address 141 illustrated in FIG. 7. One embodiment of an unique identifier of the prefetch count write command comprises a bit 134 of the write command. The bit 134 is unused in the SRAM address decode range, and is what would otherwise be an address of a larger SRAM. As an alternative, two bits 132 and 134 may be used to provide an encoded unique identifier. The address 141, except for bits 132 and 134, preferably comprises the same address as used with respect to the prior art prefetch count write command to write the prefetch count.

An embodiment of a remote transaction control 55 having logic arranged in accordance with the present invention is illustrated in FIG. 4. The transaction control 55, 57 comprises a key detector 405 and data path logic 430 that responds to the sensed unique identifier of the prefetch count write command, determining the prefetch location 91–96 of the prefetch buffer 80, 82 from the mapped storage location 201 of the prefetch count write command. The transaction control 55, 57 flushes any remaining prefetch data at the mapped prefetch location 91–96 of the prefetch buffer 80, 82 as determined by the buffer flush logic 430.

Figure 8:
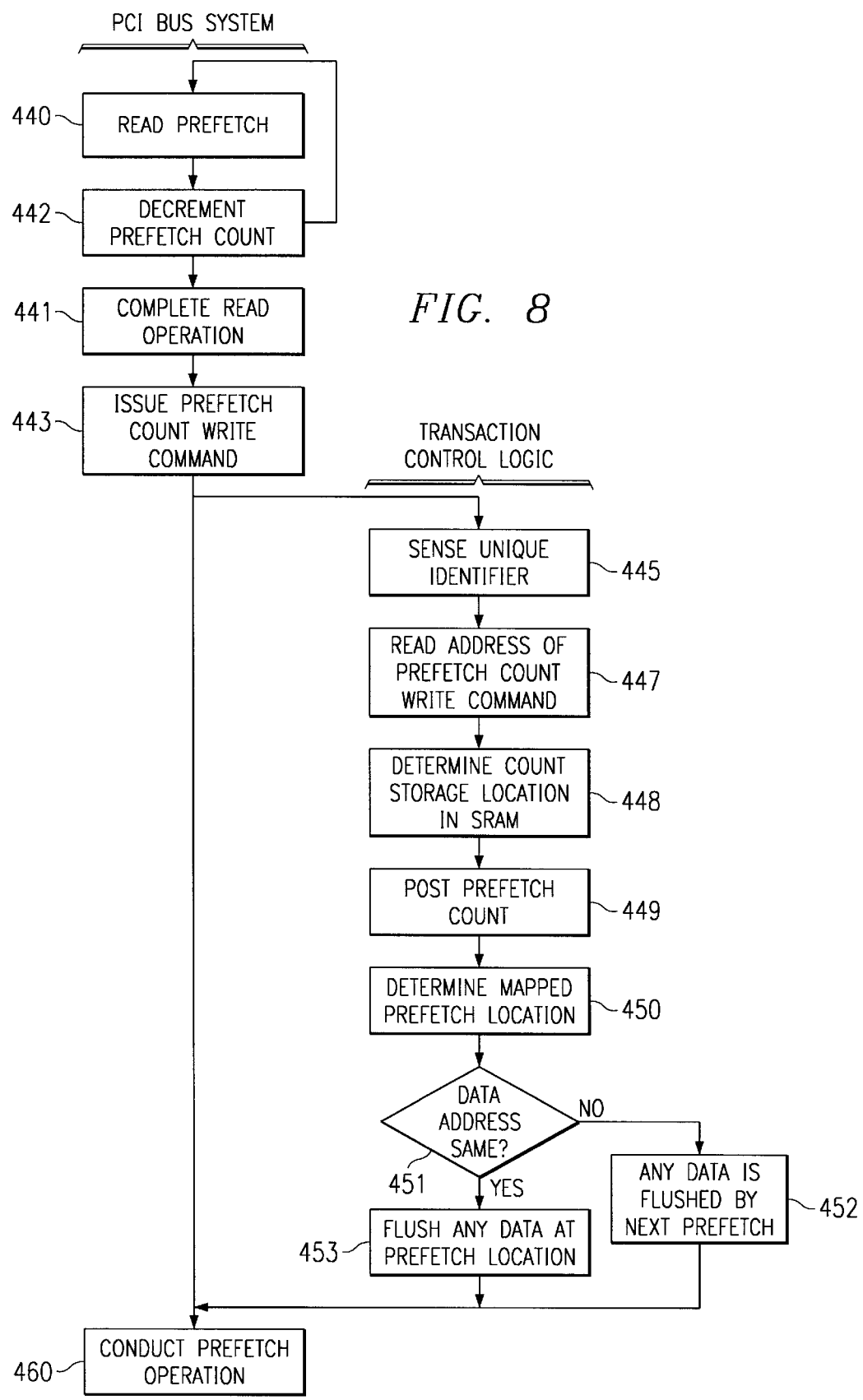
FIG. 8 is a flow chart depicting an embodiment of the method of the present invention.

An embodiment of a method employing the remote transaction control 55 in accordance with the present invention is illustrated in FIG. 8. Referring to FIGS. 2–8, a previous read prefetch step 440 will have been preceded by a prefetch count write command 130 which loads the prefetch count in the addressed storage location of the SRAM 74, as will be discussed. As each block of data is read into the appropriate prefetch location 91–96 of the FIFO buffer 80 and read from the buffer by the requester, a prefetch counter 429, in step 442, is signaled of the prefetch location, reads the current block count 140 from SRAM 74, and decrements the count by one, posting the decremented count at the prefetch count location. When the prefetch counter decrements the count to zero, it indicates that all of the blocks of data have been prefetched and loaded in the prefetch location 91–96, and then read by the requestor, illustrated by step 441, as is understood by those of skill in the art.

As discussed above, all of the data blocks may be read and transmitted by the prefetch operation so that the prefetch count will be all zero, and the prefetch location will also have no data. However, it may be the case that not all of the prefetched data has been transferred upon completion of the read operation in step 441, and the prefetch location 91–96 of the prefetch buffer 80 still contains data.

Prior to receipt of a new read command from a channel adapter, the requesting channel adapter 14A–D, in step 443, provides a prefetch count write command and prefetch count for a new read prefetch, addressed to the SRAM 74, at the transaction control 55 of FIG. 2. In step 445, a key detector 405 senses the prefetch count write command is addressed to the storage location of the SRAM 74, the storage location mapped to the FIFO prefetch buffer location that will store the prefetch data. The address of the storage location is read in step 447 and the storage In step 449, the count, as data 140, is provided to the storage location of the SRAM 74, and enables the prefetch counter 429 to post the prefetch count for the prefetch. Specifically, the block count 140 is posted at the addressed storage location of the SRAM 74 which is mapped to the prefetch location 91–96 of prefetch buffer 80. Without the unique identifier, the prefetch count write command would still write the prefetch count in the addressed SRAM storage location and enable the prefetch counter 429 to post the remainder counts, as discussed above.

Some or all of steps 443–449 may be conducted to set up the next read operation before the previous read operation is completed or ends at step 441. The prefetch count may be posted at another prefetch count storage location which is also associated with the same mapped FIFO prefetch location. In this case, the process is held at step 449 until step 441 occurs.

The key detector 405, upon sensing the unique identifier of the prefetch count write command, enables data path logic comprising buffer flush logic 430. The buffer flush logic responds to the sensing of the unique identifier, determining, in step 450, the prefetch location mapped to the prefetch count storage location. In some PCI bus systems, a prefetch to a different address or window of data addresses than that data Thus, to prevent an extra flush operation, step 451 may be provided. If the data has a different address, it will be flushed in step 452. If the address or window are the same, the buffer flush logic 430, in step 453 provides signals to flush the mapped prefetch location 80, providing the signals from buffer flush logic 430 to bus 422 and to FIFO buffer 80. The signals flush any remaining stale prefetch data from the mapped prefetch location 91–96 as determined by the buffer flush logic 430 of the prefetch FIFO buffer 80.

Then, in step 460, the PCI bus system conducts the normal read prefetch operation, accessing only the most current data from the data source.

Thus, the transaction control logic 55 has flushed unread stale data from the PCI bus system prefetch buffer efficiently, avoiding performance degradation resulting from extra reads.

Alternative arrangements of the transaction control logic 55, 57, including the key detector 405, and buffer flush logic 430 of FIG. 4, and alternative sequencing of the steps of FIG. 8 may be envisioned by those of skill in the art for carrying out the present invention. Further, the key detector 405 and data path logic including buffer flush logic 430 may be located at alternate locations in the PCI bus system 11.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system for transferring data in the form of data streams comprising a plurality of contiguous blocks, said PCI bus system having a plurality of PCI busses, at least one PCI data destination coupled to a first of said plurality of PCI busses, at least one PCI data source coupled to a second of said plurality of PCI busses, a prefetch buffer for storing said blocks of said data read from said PCI data source associated as one of said data streams in response to a read command, said blocks of said data stream stored at a prefetch location in said prefetch buffer, and a prefetch counter for posting the remaining number of blocks of said data stream to be read in response to said read command and transferred by said PCI bus system from said PCI data source to said PCI data destination, said prefetch counter posting said prefetch count at a storage location of a storage memory, said storage location of said storage memory mapped to said prefetch location in said prefetch buffer, a method for flushing stale data from said prefetch buffer, comprising the steps of:

sensing an unique identifier of a prefetch count write command to identify said prefetch count write command, said prefetch count write command referring to said storage location of said storage memory;

responding to said sensed unique identifier of said prefetch count write command, determining said prefetch location of said prefetch buffer from said mapped storage location of said prefetch count write command; and flushing any said prefetch data at said determined prefetch location of said prefetch buffer.

2. The method of claim 1, wherein said prefetch count write command unique identifier comprises at least one bit of a PCI address of said prefetch count write command, said at least one bit unused in the decode range for said storage memory, and wherein said sensing step comprises sensing said at least one bit of said PCI address to identify said prefetch count write command.

3. The method of claim 2, wherein said prefetch count write command additionally comprises count data, and wherein said determining step comprises responding to said sensed prefetch count write command unique identifier and said posted count data at said referenced storage location of said storage memory, determining said prefetch location mapped from said storage location.

4. The method of claim 2, wherein said PCI bus system comprises a plurality of said PCI data destinations, wherein said prefetch buffer comprises a plurality of parallel buffers, at least one of said plurality of parallel buffers assigned to each of said PCI data destinations, wherein said prefetch location comprises one of said plurality of parallel buffers, and wherein said determining step comprises determining the location of one of said parallel buffers mapped from said storage location of said prefetch count write command, and wherein said flushing step comprises flushing data from said entire mapped parallel buffer.

5. In a PCI bus system for transferring data in the form of data streams comprising a plurality of contiguous blocks, said PCI bus system having a plurality of PCI busses, at least one PCI data destination coupled to a first of said plurality of PCI busses, at least one PCI data source coupled to a second of said plurality of PCI busses, a prefetch buffer for storing said blocks of said data read from said PCI data source associated as one of said data streams in response to a read command, said blocks of said data stream stored at a prefetch location in said buffer, and a prefetch counter for posting the remaining number blocks of said data stream to be read in response to said read command and transferred by said PCI bus system from said PCI data source to said PCI data destination, said prefetch counter posting said prefetch count at a storage location of a storage memory, said storage location of said storage memory mapped to said prefetch location in said prefetch buffer, a system for flushing stale data from said prefetch buffer, comprising:
- a key detector coupled to one of said PCI busses for sensing an unique identifier of a prefetch count write command to identify said prefetch count write command, said prefetch count write command referring to said storage location of said storage memory; and
- data path logic coupled to said key detector for responding to said sensed unique identifier of said prefetch count write command, determining said prefetch location of said prefetch buffer from said mapped storage location of said prefetch count write command, and flushing any said prefetch data at said determined prefetch location of said prefetch buffer.

6. The system of claim 5, wherein said prefetch count write command unique identifier comprises at least one bit of a PCI address of said prefetch count write command, said at least one bit unused in the decode range for said storage memory, and wherein said key detector additionally senses said at least one bit of said PCI address to identify said prefetch count write command.

7. The system of claim 6, wherein said prefetch count write command additionally comprises count data posted at said referenced storage location of said storage memory, and wherein said data path logic determines said prefetch location mapped from said storage location.

8. The system of claim 6, wherein said PCI bus system comprises a plurality of said PCI data destinations, wherein said prefetch buffer comprises a plurality of parallel buffers, at least one of said plurality of parallel buffers assigned to each of said PCI data destinations, wherein said prefetch location comprises one of said plurality of parallel buffers, and wherein said data path logic determines said prefetch location as one of said parallel buffers mapped from said storage location of said prefetch count write command, and flushes data from said entire mapped parallel buffer.

9. A PCI bus system for transferring data in the form of data streams comprising a plurality of contiguous blocks between at least one PCI data destination and at least one PCI data source, comprising:
- a plurality of PCI busses, a first of said plurality of PCI busses coupled to said at least one PCI data destination, and a second of said plurality of PCI busses coupled to said at least one PCI data source;
- a prefetch buffer coupled to said first and said second PCI busses, for storing said blocks of said data read from said PCI data source associated as one of said data streams in response to a read command, said blocks of said data stream stored at a prefetch location in said buffer;
- a prefetch counter for posting the remaining number blocks of said data stream to be read in response to said read command and transferred from said PCI data source to said prefetch buffer and from said prefetch buffer to said PCI data destination, said prefetch counter posting said prefetch count at a storage location of a storage memory, said storage location of said storage memory mapped to said prefetch location in said prefetch buffer;
- a key detector coupled to one of said PCI busses for sensing an unique identifier of a prefetch count write command to identify said prefetch count write command, said prefetch count write command referring to said storage location of said storage memory; and
- data path logic coupled to one of said PCI busses and to said key detector for responding to said sensed unique identifier of said prefetch count write command, determining said prefetch location of said prefetch buffer from said mapped storage location of said prefetch count write command, and flushing any said prefetch data at said determined prefetch location of said prefetch buffer.

10. The PCI bus system of claim 9, wherein said prefetch count write command unique identifier comprises at least one bit of a PCI address of said prefetch count write command, said at least one bit unused in the decode range for said storage memory, and wherein said key detector additionally senses said at least one bit of said PCI address to identify said prefetch count write command.

11. The PCI bus system of claim 10, wherein said prefetch count write command additionally comprises count data posted at said referenced storage location of said storage memory, and wherein said data path logic determines said prefetch location mapped from said storage location.

12. The PCI bus system of claim 10, wherein said PCI bus system comprises a plurality of said PCI data destinations, wherein said prefetch buffer comprises a plurality of parallel buffers, at least one of said plurality of parallel buffers assigned to each of said PCI data destinations, wherein said prefetch location comprises one of said plurality of parallel buffers, and wherein said data path logic determines said prefetch location as one of said parallel buffers mapped from said storage location of said prefetch count write command, and flushes data from said entire mapped parallel buffer.

* * * * *